Feb. 17, 1925.  
J. PILON  
1,527,008  
OUTDOOR MILK CABINET  
Filed April 12, 1922  
3 Sheets-Sheet 1
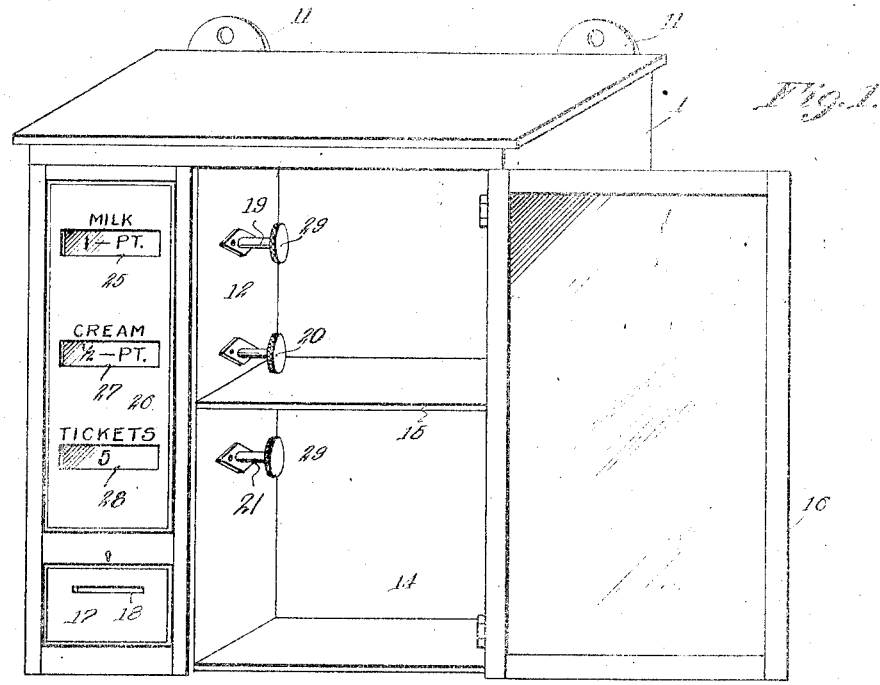
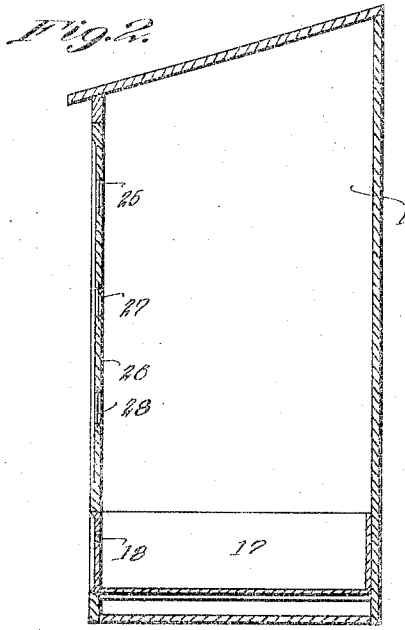
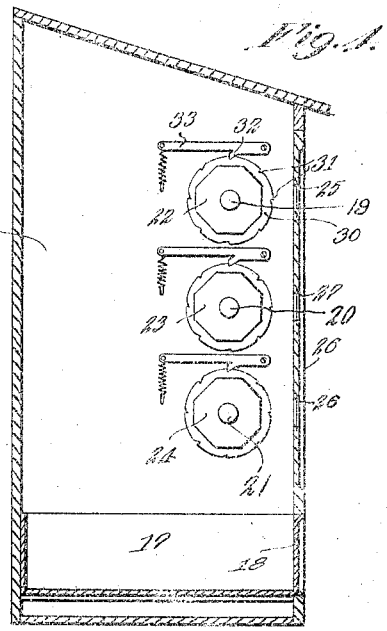
Joseph Pilon  
INVENTOR  
BY Victor J. Evans  
ATTORNEY
WITNESS:

Feb. 17, 1925.

J. PILON 1,527,008

OUTDOOR MILK CABINET

Filed April 12, 1922 3 Sheets-Sheet 2

Joseph Pilon
INVENTOR

Feb. 17, 1925.  1,527,008
J. PILON
OUTDOOR MILK CABINET
Filed April 12, 1922   3 Sheets-Sheet 3

Joseph Pilon
INVENTOR

BY Victor J. Evans
ATTORNEY

WITNESS:

Patented Feb. 17, 1925.

1,527,008

UNITED STATES PATENT OFFICE.

JOSEPH PILON, OF SAGINAW, MICHIGAN.

OUTDOOR MILK CABINET.

Application filed April 12, 1922. Serial No. 551,789.

*To all whom it may concern:*

Be it known that I, JOSEPH PILON, a citizen of the United States, residing at Saginaw, in the county of Saginaw and State of Michigan, have invented new and useful Improvements in Outdoor Milk Cabinets, of which the following is a specification.

This invention relates to cabinets and has for its object the provision of a cabinet, designed to be placed outside upon the wall or any other location or to be built into the wall of a building for the purpose of having bottles of milk and cream disposed therein upon delivery by the milk man, one great advantage of the device being that it protects the milk and cream and prevents cats and dogs from gaining access thereto and licking the necks and caps.

An important object is the provision of a device of this character which is provided with indicating means which may be set by the householder for the purpose of apprising the milk man of the quantity of milk or cream or the number of milk tickets desired, the device being furthermore equipped with a locked drawer, having a slot through which coins may be inserted by the householder in payment of the milk, cream or tickets desired, it being intended that the milk man can be furnished with a key for opening this drawer.

An additional object is the provision of a device of this character which will be simple and inexpensive in manufacture, easy to use, which will be a preventative against theft of coins or milk tickets and which will be a distinct improvement in the art.

With the above and other objects and advantages in view, the invention consists in the details of construction to be hereinafter more fully described and claimed, and illustrated in the accompanying drawings in which:

Figure 1 is a perspective view of the device showing one form thereof, the door being open.

Figure 2 is a vertical section taken through the indicating and coin holding portion.

Figure 4 is a vertical longitudinal section showing the spring detents for the indicating members.

Figure 3:
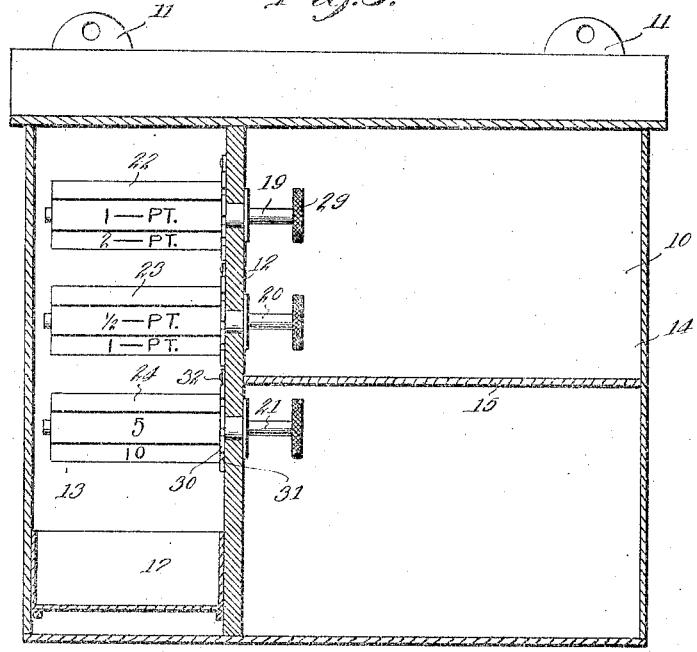
Figure 3 is a vertical longitudinal section thereof.

Referring more particularly to the drawings and especially to Figures 1 to 4, I have shown the device as comprising a rectangular casing 10 which may be provided with apertured ears 11 by means of which it may be suspended from a couple of nails or the like driven into the wall of a building or other support. This casing is divided by a vertical partition 12 into two compartments 13 and 14, the latter of which is subdivided by a shelf 15 so as to provide two compartments within which the bottles of milk or cream may be stored. The compartment 14 has its front open but normally closed by a hinged door 16 having a suitable handle and provided with any desired catch means. This door may be solid or may be formed as a frame having a glass pane therein.

The lower portion of the compartment 13 contains a drawer 17 provided with any suitable lock not shown, which is designed to be opened by the milk man who must naturally be furnished with the proper key. This drawer is for the reception of coins to pay for the quantity of milk or cream desired or to pay for any number of tickets ordered. The front of the drawer is formed with a slot 18 so that the coins may be deposited therein by the householder without it being necessary to open the drawer.

Journaled through the partition 12 and journaled in the adjacent end of the box or casing are vertically spaced spindles 19, 20 and 21 which carry indicating rolls 22, 23 and 24 respectively which are polygonal in cross section so as to provide a plurality of flat faces upon which are inscribed certain indicia. The uppermost roll 22 is disposed back of a sight opening 25 in the front panel 26 of the compartment 13 and on this front panel above this sight opening is the legend "Milk." The various flat faces of the roll 22 are inscribed with designations of quantity, for instance one-half pint, one pint, a quart and the like, while one flat face is left blank. The front panel 26 is also formed with sight openings 27 and 28 which are opposite the rolls 23 and 24 and adjacent which are inscribed the legends "Cream" and "Tickets." The roll 23 is provided with the same graduations or legends as the roll 22, while the roll 24 has its different flat faces bearing numbers, such as 5, 10, 15, etc., which are for the purpose of apprising the milk man of the number of tickets desired. The spindles 19, 20, and 21 which support the various rolls are provided with knobs 29 by means of which they may be turned to bring the desired indication of quantity on the rolls in position to be seen through the sight openings, 25, 27 and 28 so that the milkman will know exactly what is desired by the householder.

If preferred I may provide a disk 30 associated with each roll and formed with notches 31 corresponding to the flat faces and engaged by a tooth 32 on a spring pressed pivoted arm 33, the tooth operating as a pawl for holding the disk and consequently the roll against casual rotation after it has been set as desired.

Figure 5:
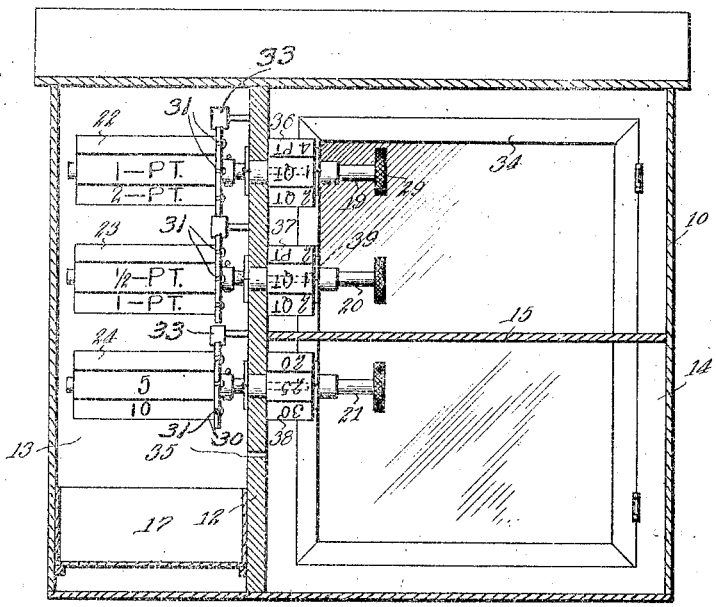
Figure 5 is a horizontal section through a modified form.
Figure 6:
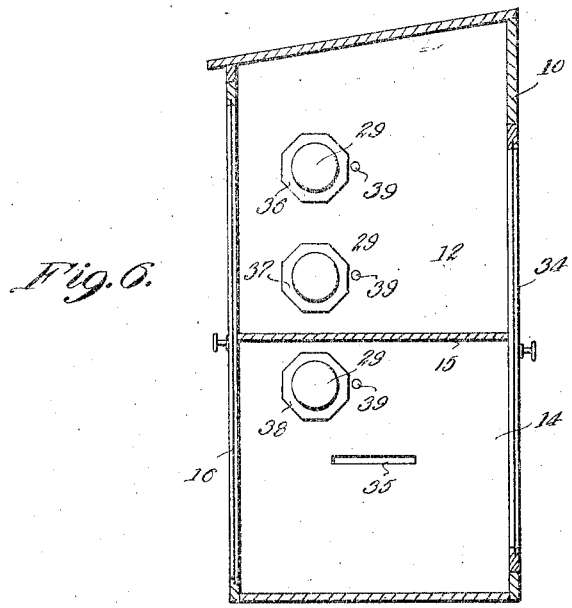
Figure 6 is a vertical section therethrough in a plane normal to the front.
Figure 7:
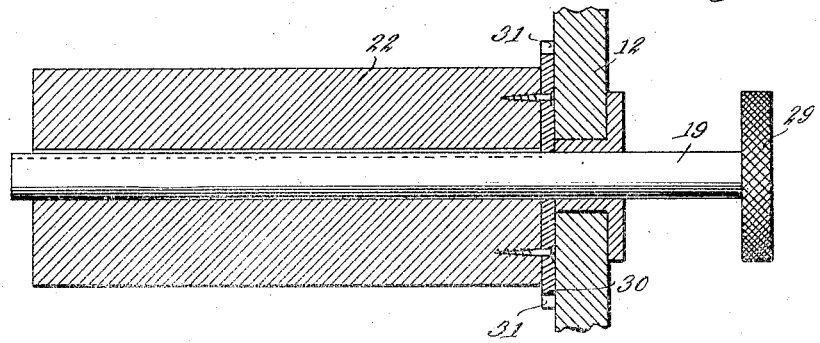
Figure 7 is a detail sectional view through one of the rollers of the form shown in Figure 3.
Figure 8:
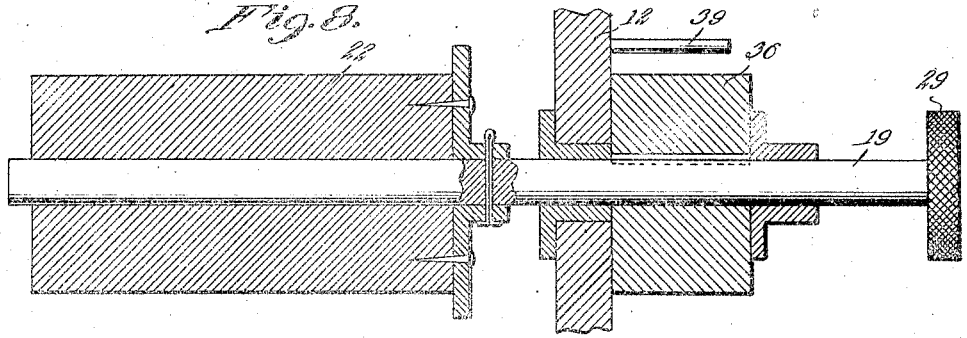
Figure 8 is a detail sectional view through one of the rollers of the form shown in Figure 5.

In Figures 5 to 7, I have shown a somewhat modified form of the device. In these figures I have shown the casing as designed to be built into the wall of a building and provided at its rear side with a door 34 which is designed to be opened and closed by the householder without it being necessary for him to go out doors to manipulate the indicating rolls or to remove the bottles of milk or cream. In this form it is also preferable to provide a slot 35 in the partition 12 in place of in front of the drawer so that the householder may deposit the money in the drawer without going outside.

Another point of variation between this form and the first described form is that in this case I provide auxiliary rolls 36, 37 and 38 on the spindles 19, 20 and 21 respectively between the partition 12 and the knobs 29, the auxiliary rolls being inscribed in the same manner as the rolls 22, 23 and 24, but in the opposite relation so that by looking at the auxiliary rolls in conjunction with pointers 39 mounted there-adjacent the householder will know what legends are being displayed through the sight openings 25, 27 and 28 without going outside to look.

In the use of both forms of the device it will be seen that ample means is provided whereby the householder may indicate his exact wishes to milkman in regard to the quantity of milk and cream to be delivered and also in regard to the number of tickets desired, if any. It is to be noted that any money deposited within the drawer will be protected from theft as the drawer is ordinarily locked and can be opened only by the milk man or the householder. Another distinct advantage is that the milk and cream are protected so that animals or insects cannot gain access thereto, the device thus providing a means for keeping the milk as sanitary as possible between the time it is delivered by the milk man and collected by the householder.

While I have shown and described the preferred embodiment of the invention, it is of course to be understood that I reserve the right to make such changes in the form, construction and arrangement of parts as will not depart from the spirit of the invention or the scope of the subjoined claim.

Having thus described the invention, I claim:

A device of the character described, comprising a casing provided with sight openings, means for displaying indicating means behind said sight openings, consisting of a plurality of rollers journaled at the rear thereof and provided with operating knobs, said rollers having their peripheries inscribed with legends as to quantity of milk or cream and the number of tickets desired, and pawl and ratchet means for preventing casual rotation of said rollers, auxiliary rollers associated with and turning with said first named rollers and likewise carrying indicia corresponding to and opposite in arrangement to the legends on the first named rolls, and pointers co-operating with said auxiliary rolls.

In testimony whereof I affix my signature.

JOSEPH PILON.